June 27, 1967 J. B. MURPHY 3,327,599
PHOTOGRAPHIC APPARATUS
Filed April 21, 1965 4 Sheets-Sheet 1
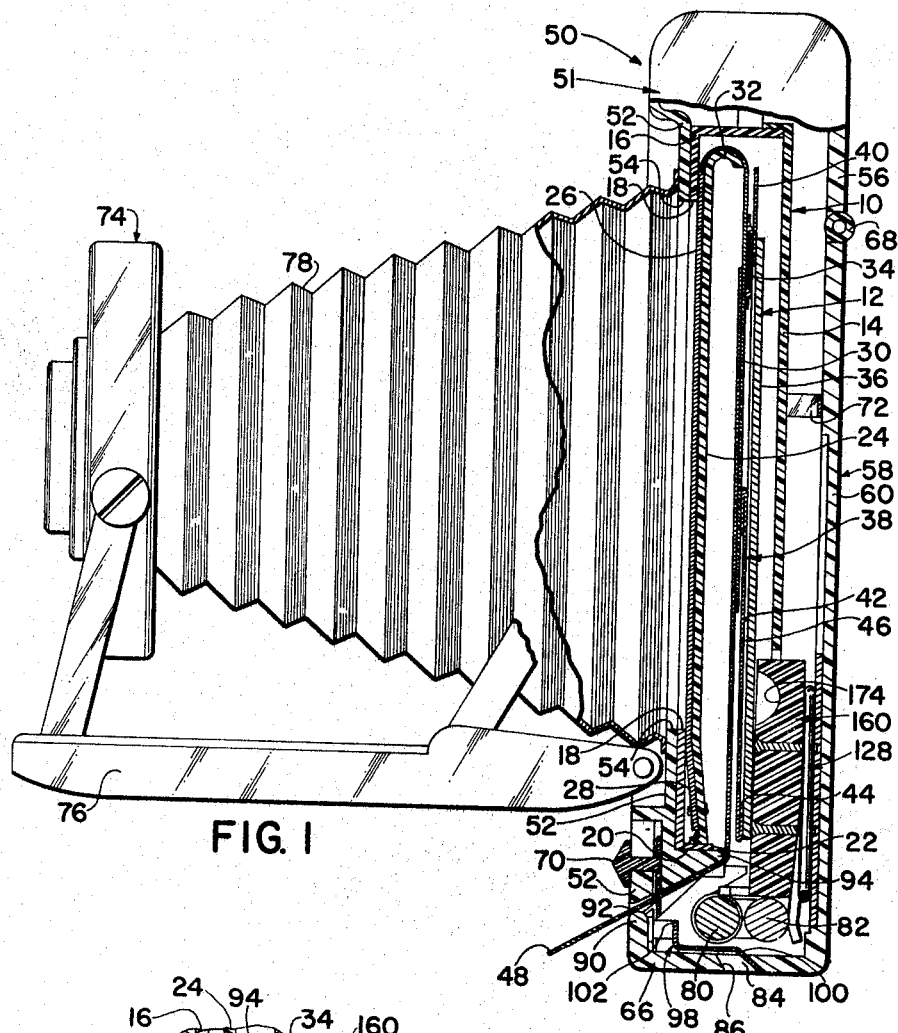
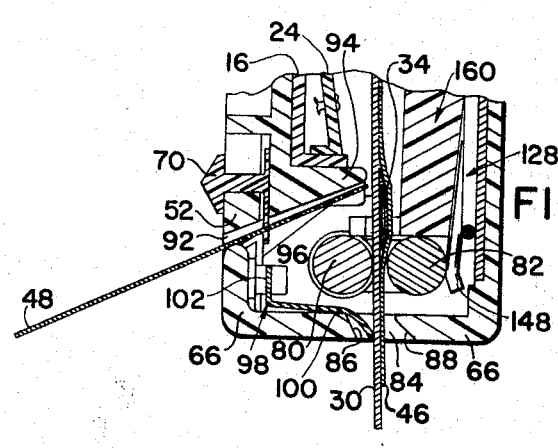
INVENTOR
John B. Murphy
BY Brown and Mikulka
and
Robert E. Corb
ATTORNEYS

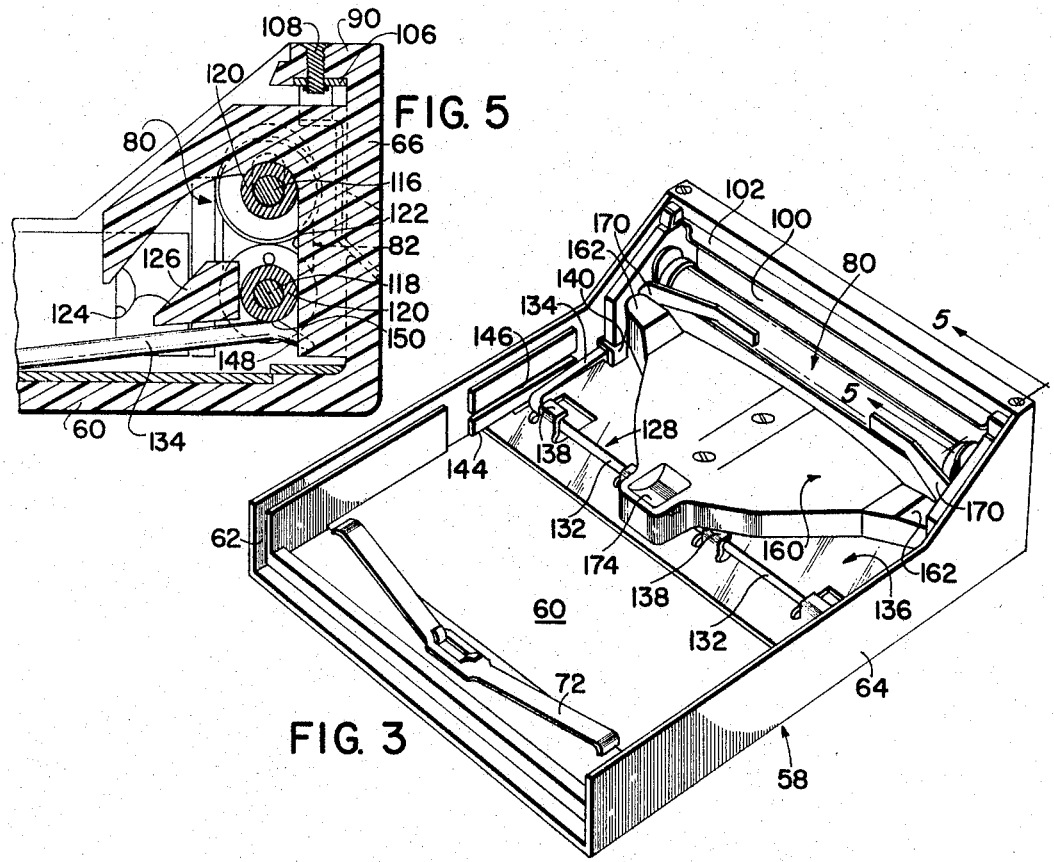

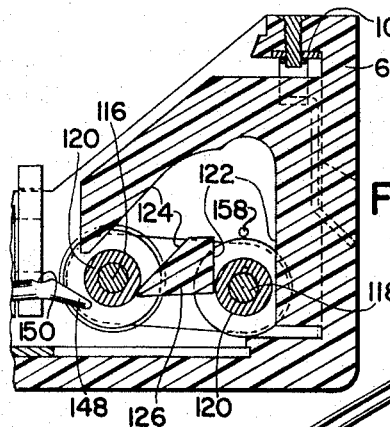
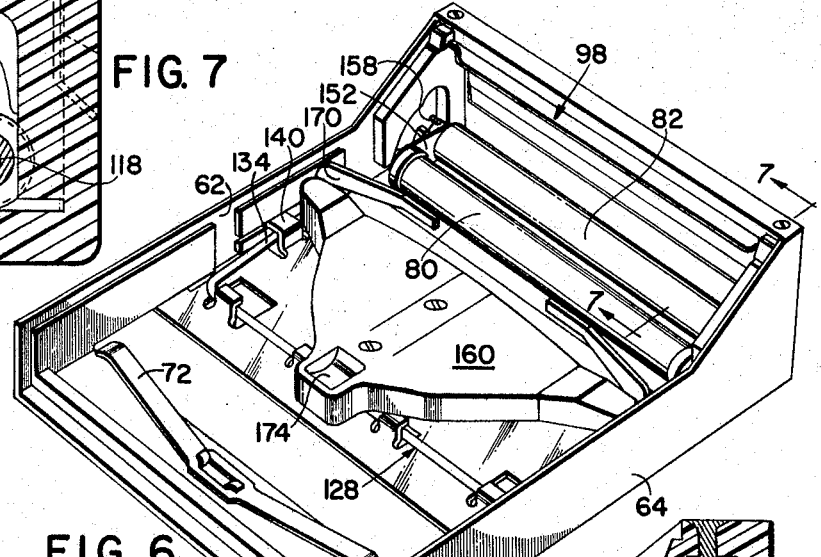
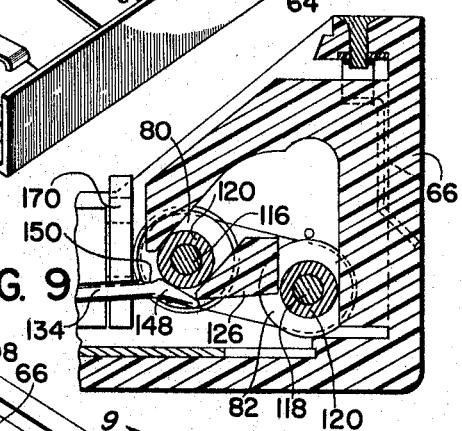
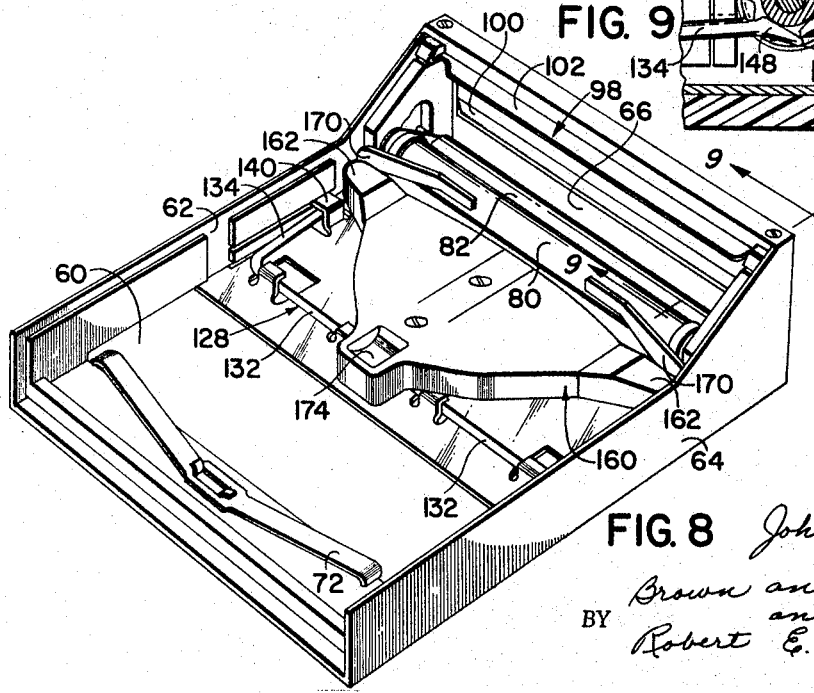
INVENTOR
John B. Murphy
BY Brown and Mikulka
and
Robert E. Corb
ATTORNEYS

United States Patent Office 3,327,599
Patented June 27, 1967

3,327,599
PHOTOGRAPHIC APPARATUS
John B. Murphy, West Roxbury, Mass., assignor to Polaroid Corporation, Cambridge, Mass., a corporation of Delaware
Filed Apr. 21, 1965, Ser. No. 449,796
14 Claims. (Cl. 95—13)

This invention relates to photographic apparatus such as camera for processing photographic sheet material and, more particularly, to apparatus for applying compressive pressure to a pair of superposed sheets to distribute a processing liquid between the sheets.

The present invention is concerned with the construction of so-called self-developing cameras generally of the same type as sold by Polaroid Corporation, designated "Model 100" and "Model 101," and shown and described together with film assemblages useful therein, for example, in U.S. Patents Nos. 3,161,122, 3,161,516, 3,165,039 and 3,165,040. Cameras of this type generally include a body or housing for holding a film pack containing a plurality of film units adapted to be successively exposed and then processed during withdrawal from the camera through a withdrawal opening therein. Processing is accomplished by drawing each film unit, including a pair of superposed sheets, from the pack between a pair of juxtaposed pressure-applying members, usually rolls, located within the camera adjacent the withdrawal opening in order to distribute a processing liquid between the superposed sheets. The camera housing includes two sections movable relative to one another to permit loading of a film pack into the housing and both of the pressure-applying members (rolls) may be mounted in juxtaposition on one of the housing sections closely adjacent the walls thereof including the walls in which the withdrawal opening is formed.

Cameras of this type heretofore have usually included a housing formed of (or at least including a frame formed of) a sturdy, structurally strong material, specifically metal, fabricated by casting, forging or the like, or by pressing sheet metal into the desired shape. This sturdy housing or frame has been required to accurately locate and support the various components of the camera, particularly the pressure-applying and film guidance systems, in proper operative relationship, as well as to absorb the stresses exerted by these components. Metal housings and/or frames of the type employed heretofore are relatively complex and expensive to fabricate and assemble, particularly as compared to camera housings formed of organic plastics, for example, by conventional injection molding methods.

An object of the invention is to provide an improved camera structure of the type described including a novel construction and mounting of the pressure-applying rolls and means for biasing the rolls toward one another enabling the camera to be fabricated easily and inexpensively of organic plastic materials.

The apparatus (camera) of the invention includes a pair of pressure-applying members in the form of juxtaposed rolls mounted with their axes substantially in a plane biased toward one another and, in their operative position, located closely adjacent a wall (or in a corner) of the camera housing near a narrow opening through which the film units are withdrawn from the camera. The rolls are employed to distribute a viscous processing liquid between a pair of sheets of each film unit and, because of the risk that the liquid may escape and collect on the rolls, provision should be made for moving the rolls to an inoperative position to permit them to be cleaned. Of course, the necessity for providing for cleaning of the rolls tends to further complicate and increase the expense of the structure required to mount and bias the rolls toward one another.

Other objects of the invention are: to provide novel and improved means for mounting a pair of pressure-applying rolls in juxtaposition with their axes in a plane adjacent a wall having a withdrawal opening therein and biasing the rolls toward one another; and to provide mounting means as described which permit the rolls easily and conveniently to be moved away from the wall and apart from one another to an inoperative position to permit cleaning and to be returned to their operative position.

A further object of the invention is to provide a camera of the foregoing type which is dependable in its operation yet is characterized by a simple and inexpensive construction comprising a minimum of easily fabricated and assembled components.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an elevational view, partially in section, showing photographic apparatus in the form of a camera embodying the invention, the section being taken substantially midway between the sides of the camera;

FIG. 2 is a fragmentary sectional view of a portion of the camera of FIGURE 1 illustrating the operation of the camera;

FIG. 3 is a perspective view of a portion of the camera of FIGURE 1;

FIG. 5 is a fragmentary sectional view taken substantially along the line 5—5 of FIG. 3;

FIG. 6 is a view similar to FIG. 3 illustrating components of the camera in another position thereof;

FIG. 7 is a fragmentary sectional view taken substantially along the line 7—7 of FIG. 6;

FIG. 8 is a view similar to FIGS. 6 and 3 illustrating components of the camera in still another position thereof;

FIG. 9 is a fragmentary sectional view taken substantially along the line 9—9 of FIG. 8; and FIG. 10 is an elevational view illustrating the operation of a component of the camera.

Figure 4:
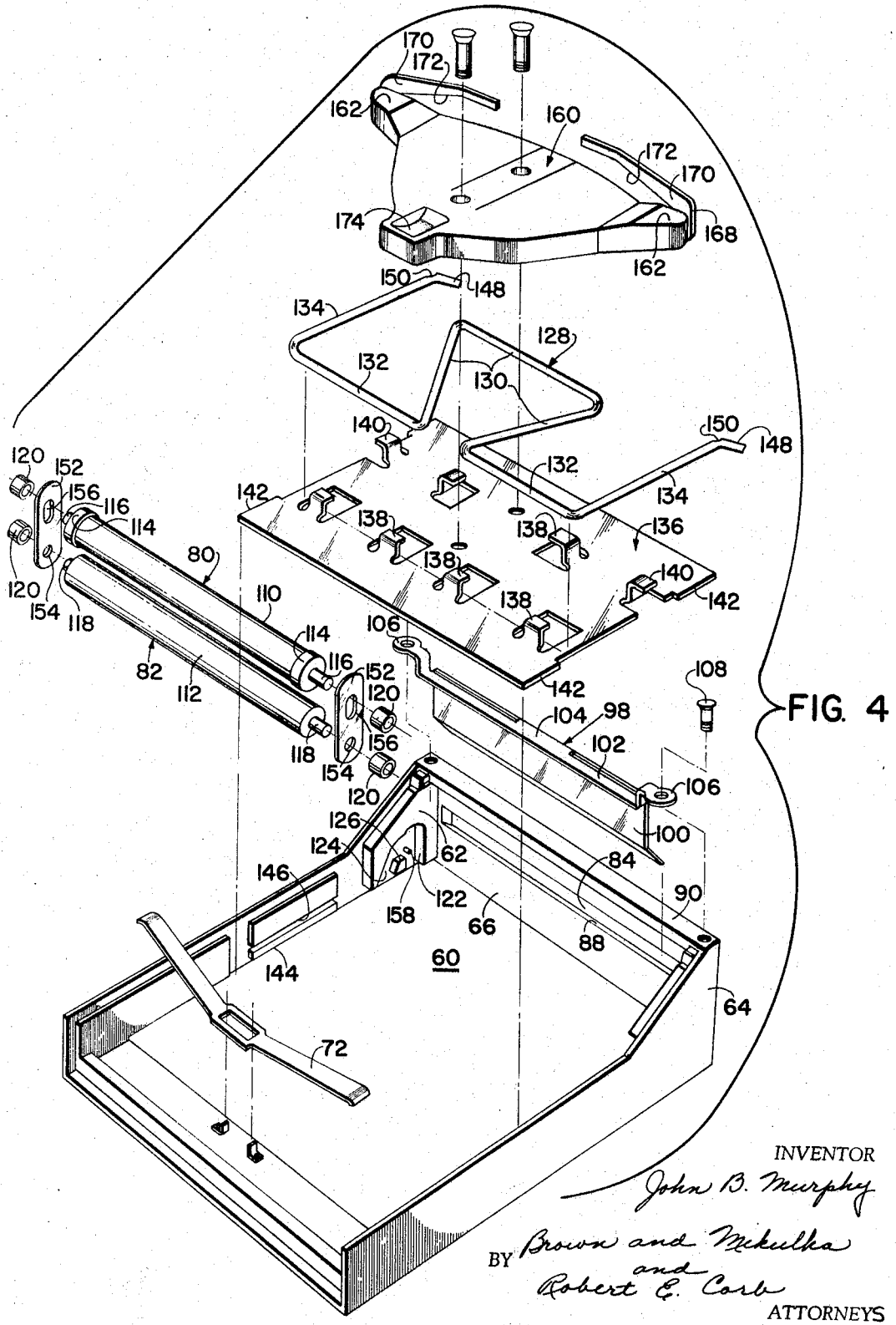
FIG. 4 is an exploded perspective view of the portion of the camera shown in FIG. 3.

Photographic apparatus in the form of a camera embodying the invention is shown in FIGS. 1 and 2 together with a film pack of the type adapted to be employed therein. The film pack, generally designated 10, is shown for purposes of description as containing a single film unit 12 with the thicknesses of some of the sheet materials exaggerated for purposes of clarity of illustration. Film pack 10 comprises a generally parallelepiped shaped container or box including a rear wall 14, a forward wall 16 having a rectangular exposure aperture 18 formed therein, an end wall 20 (shown in the drawings at the lower end of the film pack) formed with a withdrawal aperture 22; and a pressure plate 24 disposed between the forward and rear walls across exposure aperture 18 for supporting photosensitive sheet materials against the forward wall across the exposure aperture in position for exposure.

Film unit 12 comprises a photosensitive sheet 26 disposed between forward wall 16 and pressure plate 24 and including a trailing edge section 28 attached to the end of pressure plate 24 nearest end wall 20. Photosensitive sheet 26 is coupled at its leading edge to a leader sheet 30 which extends around a curved end section 32 of pressure plate 24 behind the pressure plate between the latter and rear wall 14 toward withdrawal aperture 22. A rupturable container 34 of processing liquid is mounted on leader sheet 30 in the vicinity of the leading edge of the photosensitive sheet in position to dispense its liquid contents for distribution in contact with the photosensitive sheet when subjected to compressive pressure. The film unit includes a second or image-receiving sheet 36 substantially coextensive with the photosensitive sheet, mounted on a second leader sheet 38. Second leader sheet 38 is substantially longer than the image-receiving sheet and includes a trailing end section 40 extending beyond the trailing edge of the image-receiving sheet, an intermediate section 42 including a rectangular opening 44 secured to the margins of the image-receiving sheet around the margins of opening 44, and a leading end section 46 secured to leader sheet 30 near the leading end thereof. The leader sheets and photosensitive and image-receiving sheets are so constructed and coupled with one another as to position the photosensitive sheet in superposed registered relation with the image-receiving sheet with the intermediate section of the second leader sheet located between the photosensitive and image-receiving sheets, when leader sheet 30 is drawn toward and through withdrawal aperture 22 of the film pack container. Although only one film unit 12 is shown within the film pack, the film pack will normally contain a plurality of film units, e.g., eight, all similarly constructed and arranged with the photosensitive sheets 26 disposed in stacked relation between the pressure plate and the forward wall of the film pack container.

As a means for withdrawing each film unit from the pack and from the camera, there is provided a narrow leader 48 releasably attached at one end to leader sheet 30 between the leading end thereof and the trailing edge of the photosensitive sheet and extending through withdrawal aperture 22 of the film pack. The camera is of the type including a passage through which leader 48 extends so that it may be grasped and pulled to one side of a pair of pressure-applying members within the camera for advancing the leading end portion of leader 30 and leading end section 46 of second leader sheet 38 between the pressure-applying members and from the camera through a withdrawal opening therein sufficiently to permit the leading end portion of leader sheet 30 to be engaged (manually) for withdrawing the film unit from the camera between the pressure-applying members. The initial withdrawal movement of leader 48 of a film unit causes trailing edge section 28 of photosensitive sheet 26 to become detached from pressure plate 24 and move around curved end section 32 behind the pressure plate into superposition with image-receiving sheet 36. During this movement of the photosensitive sheet of a film unit, the photosensitive sheets of any other film units within the pack remain stationary by virtue of their attachment to the pressure plate, and the image-receiving sheet of the film unit (being withdrawn) is retained against substantial movement by means within the camera which will be described more fully hereinafter. The leading end portion of leader sheet 30 and leading end section 46 of second leader sheet 38 are both tapered toward their leading ends to promote rolling of leading end section 46 upon itself during withdrawal; and leader 48 is substantially narrower than the other sheets of the film unit and is attached (e.g., by an adhesive) to leader sheet 30 substantially midway between the sides thereof in such a manner as to provide a strong, secure connection when leaders 30 and 48 are advanced in the same direction, and a weak connection which becomes readily detached when leaders 30 and 48 are advanced along divergent paths.

The invention is incorporated in a camera, generally designated 50, having a body or housing including a forward section 51 comprising a forward wall 52 with a recessed section formed with an exposure aperture 54, side walls and, at one end, an end wall and a relatively short rear wall 56. The camera body, particularly the forward and rear walls are suitably formed so as to locate film pack 10 in proper position for exposure with exposure aperture 18 in the forward wall of the film pack aligned with exposure aperture 54 in forward wall 52 of the camera body. To completely enclose the film pack and the operative components of the camera while providing for loading of a film pack into the camera, the camera housing includes a rear section 58 comprising a rear wall 60, side walls 62 and 64 and an end wall 66, pivotally mounted on the forward section of the camera body by a hinge 68 secured to rear walls 56 and 60. A latch mechanism 70 is mounted on forward housing section 51 for releasably retaining the two camera housing sections in the closed or operative position shown in FIGURE 1 and permits the rear section to be pivoted to an open position to permit loading of a film pack into the camera housing. A spring 72 is provided on the inside of rear wall 60 for engaging the film pack and retaining it against forward wall 52 of the camera body.

Forward and rear sections 51 and 58 of the camera housing are designed to be formed of organic plastic materials by conventional mass production manufacturing methods such as, for example, injection molding. This is made possible by a construction such that the dimensions of the camera body are not critical and most of the stresses exerted by components of the camera mechanism are absorbed by the components themselves or by relatively strong portions of a single section of the camera body especially constructed for this purpose.

The camera, as shown in FIGURE 1, includes the conventional components of a camera including a lens and shutter assembly 74, a door 76 on which is mounted an erecting system, the door in turn pivotally mounted on the forward section of the camera body, and a bellows 78 connecting the lens and shutter assembly with forward wall 52 of the camera body. In the preferred form, the bellows and erecting system are capable of being folded to locate the lens and shutter assembly within the recess defined by forward wall 52 with door 76 covering the recess to provide a compact camera construction.

Processing of the exposed photosensitive sheet 26 of a film unit is accomplished by advancing the photosensitive and second sheets of the film unit in superposition between a pair of juxtaposed pressure-applying members which compress container 34 to dispense its liquid contents for distribution between the superposed photosensitive and image-receiving sheets. The juxtaposed pressure-applying members preferably take the form of cylindrical rolls 80 and 82 mounted in juxtaposition with their axes substantially in a plane perpendicular to the plane of movement of the sheets within the camera housing adjacent end wall 66. The end wall is provided with a narrow withdrawal opening or passage 84 aligned with the bite of the rolls through which a film unit may be advanced from the camera housing between rolls 80 and 82. Passage 84 is defined by elongated forward and rear lateral surfaces designated, respectively, 86 and 88, inclined outwardly and rearwardly for reasons which will appear more fully hereinafter.

Rear body section 58 includes a relatively short forward wall 90 which cooperates with forward wall 52 to define a withdrawal opening 92 for leaders 48. The film pack is initially provided with a cover sheet (not shown) for closing exposure aperture 18 and this cover sheet includes a leader coupled with leader 48 (of the first film unit) which is preferably folded upon itself so as not to extend from the film pack to the same extent as the leader of the cover sheet and is, in turn, secured to the folded leader 48 of the next succeeding film unit. By virtue of this arrangement, when the film pack is loaded into the camera in the position shown in FIGURE 1 and the rear body section is pivoted into closed position, preferably only the first leader, that is, the leader attached to the cover sheet, extends from the camera through withdrawal opening 92 so that the first leader may be grasped for withdrawing the cover sheet through opening 92 and, at the same time, unfolding and withdrawing the leading end portion of leader 48 of the first film unit so that the latter may be grasped manually. To process a film unit, leader 48 is grasped and withdrawn from the camera through opening 92 to advance the leading end portion of leader 30 and the leading end section 46 of second leader 38 between rolls 80 and 82 through passage 84 substantially to the position shown in FIG. 2, at which point leader 48 separates from the film unit.

Means are provided for guiding leader 30 and leading end section 46 between the pressure-applying rolls and effecting separation of leader 48. In the form shown, these means include a stripper bar 94, which may be formed as an integral part of the forward body section 51, extending from forward wall 52 rearwardly within the camera body adjacent end wall 20 of the film pack. Stripper bar 94 includes a rear surface located approximately in the plane of movement of film units from within the film pack between the pressure-applying rolls and is formed with a channel 96 having a width narrower than the widths of leader sheets 30 and 38, but slightly wider than leader 48, so that the latter will pass through the channel and withdrawal opening 92, while the leader sheets are unable to enter the channel and are guided by the stripper bar between the pressure-applying rolls.

The camera includes a closure for withdrawal opening 84 for preventing the admission of light and dust through the opening into the camera housing while permitting advancement of a leader through the opening from the housing. This closure, in the form shown, is quite simple in construction and is designed to be opened automatically by engagement of the leading edge of leader sheet 30, sufficiently to allow a film unit to be withdrawn through the opening while engaging the film unit in such a way as to admit little or no light through the opening during withdrawal movement of a film unit. The closure, designated 98, comprises a single element preferably formed of a resilient sheet material, such as metal or organic plastics, and includes an elongated closure section 100 having a generally obtuse V-shaped cross section and an elongated resilient support section 102 coupled intermediate its ends to the mid portion of the closure section by a connecting section 104. Support section 102 includes L-shaped brackets 106 at its ends at which the support section is secured to forward wall 90 adjacent side walls 62 and 64 by such means as screws 108. Closure 98 is mounted so that closure section 100 extends rearwardly adjacent the inner surface of end wall 66 toward opening 84 and into the opening with the edge portion of closure section 100 disposed substantially in face-to-face relation with rear lateral surface 88 defining the rear side of the opening.

It will be apparent (see FIGURE 1) that this closed position the closure effectively prevents the admission of light directly into the camera housing (in the direction of film movement) while also closing the opening against dust and dirt. The rear edge portion of closure section 100 is inclined with respect to the plane of movement of leader 30 between the pressure-applying rolls and is located so that the leading edge of the leader will engage this inclined edge portion of the closure section to deflect the closure section forwardly against the bias of support section 102 which functions as a weak spring for retaining the closure section in closed position. During advancement of leader 30 through withdrawal opening 84, closure section 100 is displaced to the position shown, for example, in FIG. 2, at which it bears against the forward surface of the leader and, during withdrawal of the film unit, against the outer surface of the photosensitive sheet. The rear surface of leading end section 46 and the outer surface of the image-receiving sheet will bear against an edge of rear lateral surface 88 during withdrawal through the opening so that little or no light will be admitted through the opening.

The camera includes means for mounting rolls 80 and 82 for rotation in juxtaposition with their axes substantially in a plane perpendicular to the plane of movement of the film units from the pack through opening 84; biasing the rolls toward one another so as to apply compressive pressure to sheet materials moved between the rolls; and permitting movement of the rolls from their operative position into an inoperative position at which the rolls are spaced away from end wall 66 and are separated from one another so that they can be cleaned. These mounting means are characterized by a simple and inexpensive construction that facilitates the easy movement of the rolls between their operative and inoperative positions and, in the form shown, comprise portions of side walls 62 and 64 of the camera housing, the rolls themselves and means including a spring for biasing the rolls toward one another.

Rolls 80 and 82 comprise substantially cylindrical midportions, designated 110 and 112, respectively, and roll 80 is provided with raised collars 114 on the ends of midportion 110 for predeterminedly spacing the mid-portions of the rolls apart from one another to control distribution of the processing liquid and allow passage of a leader between the rolls. Roll 80 includes stub shafts 116 on its ends and roll 82 includes stub stafts 118 on its ends, the stub shafts being rotatably engaged in cylindrical bushings 120 formed of a material having a relatively low coefficient of friction. Each of side walls 62 and 64 is provided with a first channel or recess 122 extending from rear wall 60 forwardly and substantially perpendicular to the plane of movement of the film units between the rolls, and having a depth approximately equal to the axial length of one of bushings 120 and a second channel or recess 124 extending from rear wall 60 rearwardly and at an angle with respect to the first channel and intersecting the first recess near the rear end thereof. The second recess may be curved slightly and the two recesses converge to form substantially a V, leaving a generally wedge-shaped element 126 between them and spaced from rear wall 60 by a gap approximately equal in width to the diameter of a bushing 120.

In the operative position of the pressure-applying rolls shown in FIGS. 3 and 5, bushings 120 on stub shafts 116 and 118 are engaged in recesses 122 with the bushings 120 engaged around stub shafts 116 each engaged at the forward end of a recess 122 at the intersection of the latter and a recess 124, and each of bushings 120 engaged around stub shafts 118 engaged between an element 126 and the opposite side of recess 122. The rolls are retained in this operative position and roll 82 is biased toward roll 80 by resilient means in the form of a torsion spring 128. Spring 128 is formed of a single length of wire and includes a generally triangular medial section 130; torsion sections 132 extending linearly in opposite directions from medial section 130; and a pair of legs 134 extending substantially at right angles and parallel with one another from the ends of torsion sections 132. The major portions of legs 134 extend substantially in a plane disposed at an angle with respect to the plane of medial section 130, and the latter and torsion sections 132 are mounted substantially in a plane on a support plate 136 by tabs 138 turned up from the support plate into engagement with medial section 130 and torsion sections 132 so as to retain the torsion and medial sections substantially in a plane while permitting torsional strains to be applied to the torsion sections. A pair of tabs 140 are also turned up from plate 136 for engaging legs 134 and providing limit stops for movement of the legs under the bias of torsion sections 132. Support plate 136 is mounted in face-to-face relation with rear wall 60 and is provided with projections 142 at its lateral edges which are slidably engaged in channels 144 in side walls 62 and 64. Channels 146 are provided in side walls 62 and 64 for slidably receiving the ends of tabs 140 so that support plate 136 and torsion spring 128 mounted thereon are movable in a plane parallel with the inner surface of rear wall 60 and generally parallel with the plane of movement of the film units toward and away from end wall 66.

Each of legs 134 includes an end section 148 bent rearwardly and having a small recess or notch 150 in its forward surface near the apex of the bend for engaging a bushing 120 engaged around a stub shaft 118. Notches 150 and bushings 120 cooperate very much as a detent for retaining the torsion spring in engagement with the bushings and in the operative position shown in FIGS. 3 and 5; and the forward ends of recesses 122 are extended slightly and shaped to conform to bushings 120 on stub shafts 116 to retain the last-mentioned bushings against movement when roller 82 is biased toward roll 80.

It will be apparent that in the operative position of the rolls, both rolls are located closely adjacent end wall 66 with roll 80 located in the corner formed by forward wall 90 and end wall 66 and roll 82 located in the corner defined by end wall 66 and rear wall 60. In this position, access to the rolls for the purpose of cleaning is very limited and to facilitate cleaning of the rolls, provision is made for separating the rolls and moving at least roll 80 away from end wall 66. This is accomplished by sliding support plate 136 and the torsion spring mounted thereon away from end wall 66 so as to disengage end sections 148 of the torsion spring from bushings 120 in which stub shafts 118 of roll 82 are journalled. This permits bushings 120 engaged around stub shafts 118 on roll 80 to be slid within recesses 124 rearwardly and away from end wall 66 to the open or inoperative position shown in FIGS. 6 and 7, in which stub shafts 116 and 118 are located to opposite sides of wedge-shaped elements 126. Means are provided for retaining the rolls and bushings together and within the camera in the inoperative position thereof, and these means include connecting elements 152 in the form of thin plates each having a hole 154 engaged around one of stub shafts 118 and an elongated slot 156 engaged around a stub shaft 116. Connecting elements 152 are engaged between the ends of the medial sections of the rolls and the bushings and permit roll 80 to be moved with respect to roll 82 in a plane common to the axes of the two rolls and to be pivoted with respect to roll 82 about the axis thereof. Small projecting pins or studs 158 are mounted on side walls 62 and 64 within recesses 122 for limiting the forward movement of stub shafts 118 within recesses 122, whereas the movement of stub shafts 116 and roll 80, of which they are a part, into open position, is limited by slots 156 and wedge-shaped elements 126.

The camera includes means for automatically moving the pressure-applying rolls from the inoperative position shown in FIGS. 6 and 7, to the operative position shown in FIGS. 3 and 5; and for cooperating with the pressure-applying rolls and the film pack to releasably restrain the image-receiving sheet of a film unit against movement between the pressure-applying rolls during movement of the photosensitive sheet of the film unit into registration with the image-receiving sheet and engage, substantially without deforming, the marginal portions of the film unit to prevent escape of the processing liquid between the lateral edges of the film unit during movement between the pressure-applying members and distribution of the processing liquid thereby. These means and the operation thereof are illustrated in FIGS. 4, 8, 9 and 10 and comprise a guide member 160 mounted on support plate 136 and having lateral support surfaces 162 positioned for engaging the rear surface of image-receiving sheet 36 of a film unit between the pack and the pressure-applying rolls and supporting the film unit for movement substantially in a plane from the film pack between the pressure-applying rolls. Mounted on the side of guide member 160 between the latter and the pressure-applying rolls are a pair of generally U-shaped control members 164, each having a first arm 166 mounted on guide member 160 at one end near the medial portion of the support member and extending outwardly towards the sides of the camera housing, a forwardly extending connecting arm 168 and inwardly extending engagement arms 170 having a surface facing in a direction opposite to the direction of movement of the film units between the pressure-applying rolls and being disposed in face-to-face contact with the surface of guide member 160 facing in the direction of movement of the film units. Control members 164 are formed as an integral part of guide member 160, preferably of an organic plastic material such as formaldehyde derived polyacetal sold by Celanese Polymer Co. under the trade name "Celcon," which is resilient and resists taking a set when deformed for extended periods of time. The engagement arm 170 of each control member 164 includes a surface facing rearwardly and joining the aforementioned surface facing in a direction opposite to the direction of film movement, at an edge designated 172 extending from a position outside of the marginal edges of the film units and rearwardly of the plane of movement of a film unit supported on support surfaces 162 inwardly toward the center of the film unit and forwardly to the opposite side of the plane of movement of the film unit, so as to cooperate with a support surface 162 of guide member 160 to function very much in the nature of scissors to compress, without deforming, the lateral marginal portions of a film unit during movement of the film unit in the aforementioned plane between the guide member and engagement arms 170 and between the pressure-applying rolls as shown in FIG. 10.

Control members 164, in the operative position of the pressure-applying rolls and guide member, are disposed very close to or against the pressure-applying rolls with edges 172 of engagement arms 170 intersecting the plane of support surfaces 162 inwardly of the lateral edges of the photosensitive and image-receiving sheets of a film unit. By virtue of this construction, tapered leaders 30 and 46 are able to pass between engagement arms 170, whereas the leading end of image-receiving sheet 36, if moved forward due to frictional engagement with the leaders and the photosensitive sheet, will be engaged by arms 170 and restrained thereby against movement until tension is applied to the photosensitive and image-receiving sheets by the tapered leaders, deforming control members 164 sufficiently to allow the photosensitive and image-receiving sheets to pass between the engagement arms and support surfaces of guide member 160. During moving of a film unit between engagement arms 170 and support surfaces 162, the film unit is supported by the surfaces substantially in a plane while the engagement arms compress the lateral marginal portions of the film unit against the support surfaces substantially without deforming the sheets and thereby prevent escape of the processing liquid from between the edges of the sheets as the liquid is being distributed between the sheets by the pressure-applying rolls. It is important that compressive pressure be applied as a shearing force to the margins of the sheets without deforming the sheets because deformation of the sheets out of their plane of movement has been found to be a contributing cause of improper, uneven or incomplete liquid distribution.

Control members 164, in addition to releasably restraining the image-receiving sheet against movement and preventing escape of the processing liquid at the margins of the sheets, also function to help control the direction of withdrawal movement of the film unit between the pressure-applying rolls and thereby prevent mistracking of the film unit. In this connection, it will be noted from FIG. 10 that edge 172 of one engagement arm 170 (on the right) intersects support surface 162 further from the center of the path of movement of the film units than the point (on the left) at which the edge 172 of the other engagement arm 170 intersects support surface 162. It has been found that the tendency to withdraw a film unit in an improper direction, that is, other than perpendicular to the plane of the axes of the pressure-applying rolls, is usually in one direction, and it is to account for this predominating mistracking tendency that the control members are provided with this asymmetric construction. The point of intersection of edge 172 and support surface 162 closest the center of path of movement of the film unit is provided on that side of the camera towards which experience has shown the strongest tendency to pull the film unit.

In order to automatically move the pressure-applying rolls from their inoperative position shown in FIGS. 6 and 7, to their operative position shown in FIGS. 3 and 5, support plate 136 and guide member 160 mounted thereon are simply moved toward the spread rolls and end wall 66. During the initial portion of this movement, end sections 148 of torsion spring 128 engage bushings 120 on stub shafts 116 and act as cams to partially pivot roll 80 from its inoperative position toward its operative position as shown in FIGS. 8 and 9, thereby enabling control members 164 to engage and move roll 80 into its operative position. During movement of the support plate and torsion spring from its inoperative to operative position, end sections 148 of the torsion spring are engaged and deflected rearwardly by wedge-shaped elements 126 so as to pass to the rear of the wedge-shaped elements into engagement with bushings 120 on stub shafts 118 of roll 82. Thus, it will be seen that movement of the rolls into operative position is accomplished by the cooperation of both the torsion spring and control members 164, with the torsion spring initiating the movement of roll 80, the control members completing the movement of roll 80 into operative position and the torsion spring thereafter biasing roll 82 toward roll 80 and retaining the rolls in operative position. A recess 174 is provided in guide member 160 to facilitate engagement of the guide member for sliding it from its operative to its inoperative position and returning it to its operative position.

It will be apparent that the construction of the camera housing of the invention, particularly the rear section thereof, is ideally designed to be fabricated of inexpensive materials such as organic plastics by mass production methods such as injection molding, because the stresses exerted by the spring on the pressure-applying rolls are entirely absorbed by the rear section of the housing, particularly portions of the rear and side walls thereof. Both pressure-applying rolls are mounted on a single housing section and are positioned by two recesses in side walls of the rear housing section so that accurate location of the pressure-applying rolls with respect to one another is achieved with a simple and inexpensive construction. This construction also facilitates cleaning of the rolls by providing for partial withdrawal and separation of the rolls merely by engaging and sliding an element (the support plate and guide member) through a short distance relative to the rolls. Returning the rolls to their operative position and biasing them toward one another is also an easy matter and involves only engaging and sliding the support plate and guide member toward the rolls to their original position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. In photographic apparatus comprising a housing including an opening through which photographic film is withdrawn and a pair of elongated juxtaposed pressure-applying members mounted within said housing adjacent said opening for applying compressive pressure to said film during movement thereof between said members from said housing through said opening, means for mounting said pressure-applying member in juxtaposition adjacent said opening and biasing said members toward one another, the last-mentioned means comprising, in combination:
projections extending longitudinally from the ends of each of said members;
said housing including opposed walls each having a first recess therein extending in a direction generally perpendicular to the direction of movement of said film between said members through said opening and a second recess disposed at an angle to said first recess and intersecting said first recess at one end thereof to form substantially a V;
said projections being slidably engaged in said recesses for mounting said members for movement between an operative position in which said projections are engaged within said first recess with said projection on each end of one of said members engaged at said one end of said first recess, and an inoperative position at which said members are separated and said projections on said one member are disposed in said second recess at locations therein spaced from said first recess; and
resilient means for engaging said projections on said other member to bias said other member toward said one member when said members are in said operative position.

2. The photographic apparatus of claim 1 wherein said pressure-applying members are in the form of rolls, said projections comprising shafts extending axially from the ends of said rolls; and said projections include bushings slidably engaged in said recesses and shafts are engaged for rotation in said bushings.

3. Photographic apparatus as defined in claim 1 including retaining means engaged with said projections for coupling said members and permitting limited linear movement of said members toward and away from one another and arcuate movement of said one member relative to said other member about said projections on said other member.

4. Photographic apparatus as defined in claim 1 including means mounting said resilient means for movement into and from engagement with said projections on said other member.

5. In photographic apparatus comprising a housing including an opening through which photographic film is withdrawn, and a pair of juxtaposed pressure-applying members mounted within said housing adjacent said opening for applying compressive pressure to said film during movement thereof between said members from said housing through said opening, means for mounting said pressure-applying members in juxtaposition adjacent said opening and biasing said members toward one another, the last-mentioned means comprising, in combination:
projections extending longitudinally from the ends of each of said members;
said housing including opposed walls each having a first recess therein extending in a direction generally perpendicular to the direction of movement of said film between said members through said opening and a second recess disposed at an angle to said first recess and intersecting said first recess at one end thereof to form substantially a V;
said projections being slidably engaged in said recesses for mounting said members for movement between an operative position in which said projections are engaged within said first recess with said projection on each end of one of said members engaged at said one end of said first recess, and an inoperative position at which said members are separated and said projections on said one member are disposed in said second recesses at locations therein spaced from said first recess;
support means mounted on said housing; and spring means mounted on said support means including sections for engaging said projections on said other member for biasing said other member lengthwise of said first recesses toward said one member into operative position;

said support means being mounted on said housing for movement from an operative position in a direction generally opposite to the direction of movement of said film between said members through said opening to an inoperative position for disengaging said spring means from said projections to permit said members to move into said inoperative position thereof.

6. Photographic apparatus as defined in claim 5 in which said pressure-applying members are in the form of rolls and said projections comprise shafts extending axially from the ends of said rolls.

7. Photographic apparatus as defined in claim 6 wherein said projections include bushings slidably engaged in said recesses and said shafts are engaged for rotation in said bushings.

8. Photographic apparatus as defined in claim 5 including retaining means engaged with said projections for coupling said members and permitting limited linear movement of said members toward and away from one another and arcuate movement of said one member relative to the other of said members about said projections on said other member.

9. Photographic apparatus as defined in claim 8 wherein said retaining means include a retaining element located at each end of said members, each of said projections on said one member is engaged for limited linear movement in an opening in one of said elements and each of said projections on said other member is engaged for rotation in another opening in one of said elements.

10. Photographic apparatus as defined in claim 5 wherein each of said first recesses is provided with a portion at said one end thereof for engaging and constraining said projection on said one member against movement in substantially any direction except toward the other of said members.

11. Photographic apparatus as defined in claim 5 wherein said support means comprise a member slidably engaged in recesses in said opposed walls.

12. Photographic apparatus as defined in claim 5 wherein said support means include means for engaging said one member during movement of said support means from said inoperative to said operative position thereof to urge said one member into said operative position thereof.

13. Photographic apparatus as defined in claim 5 wherein said sections of said spring means include cam surfaces for engaging and coacting with said projections on said one member for displacing said one member from said inoperative position thereof partially into said operative position thereof during an initial portion of movement of said support means from said inoperative to said operative position thereof.

14. Photographic apparatus as defined in claim 13 wherein said support means include means for engaging and moving said one member into said operative position thereof during an intermediate portion of said movement of said support means into said operative position thereof; and said spring means are so constructed and mounted on said support means as to engage said projections on the other of said members and bias said other member toward said one member during the terminal portion of said movement of said support member into said operative position thereof.

References Cited

UNITED STATES PATENTS 3,270,643  9/1966  Fernald _____ 95—13.

JOHN M. HORAN, *Primary Examiner.*